Aug. 8, 1933.    H. L. HOWELL    1,921,675
MACHINE FOR CLEANING WINDOW SHADES
Filed Nov. 19, 1932    3 Sheets-Sheet 1
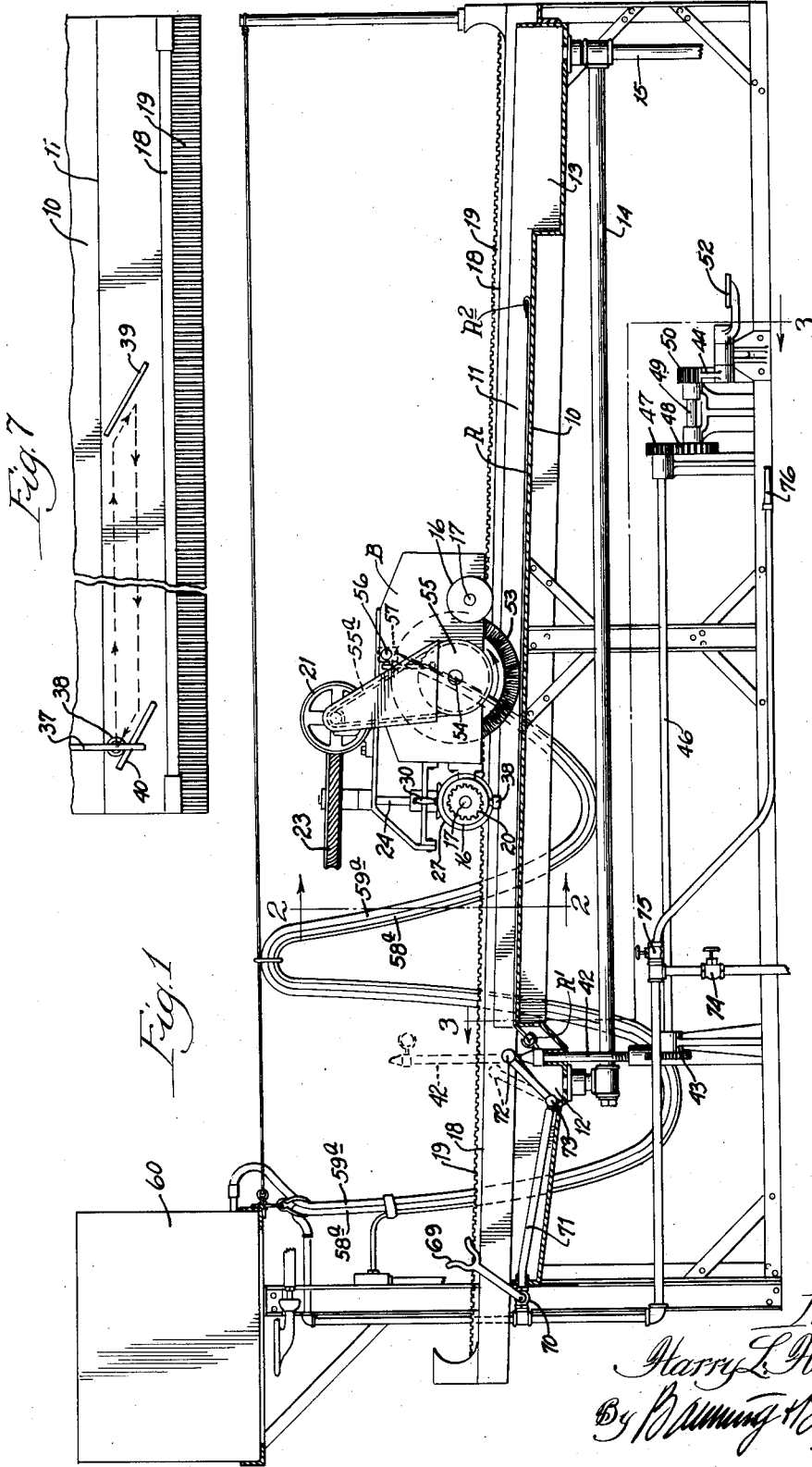

Aug. 8, 1933.    H. L. HOWELL    1,921,675
MACHINE FOR CLEANING WINDOW SHADES
Filed Nov. 19, 1932    3 Sheets-Sheet 2
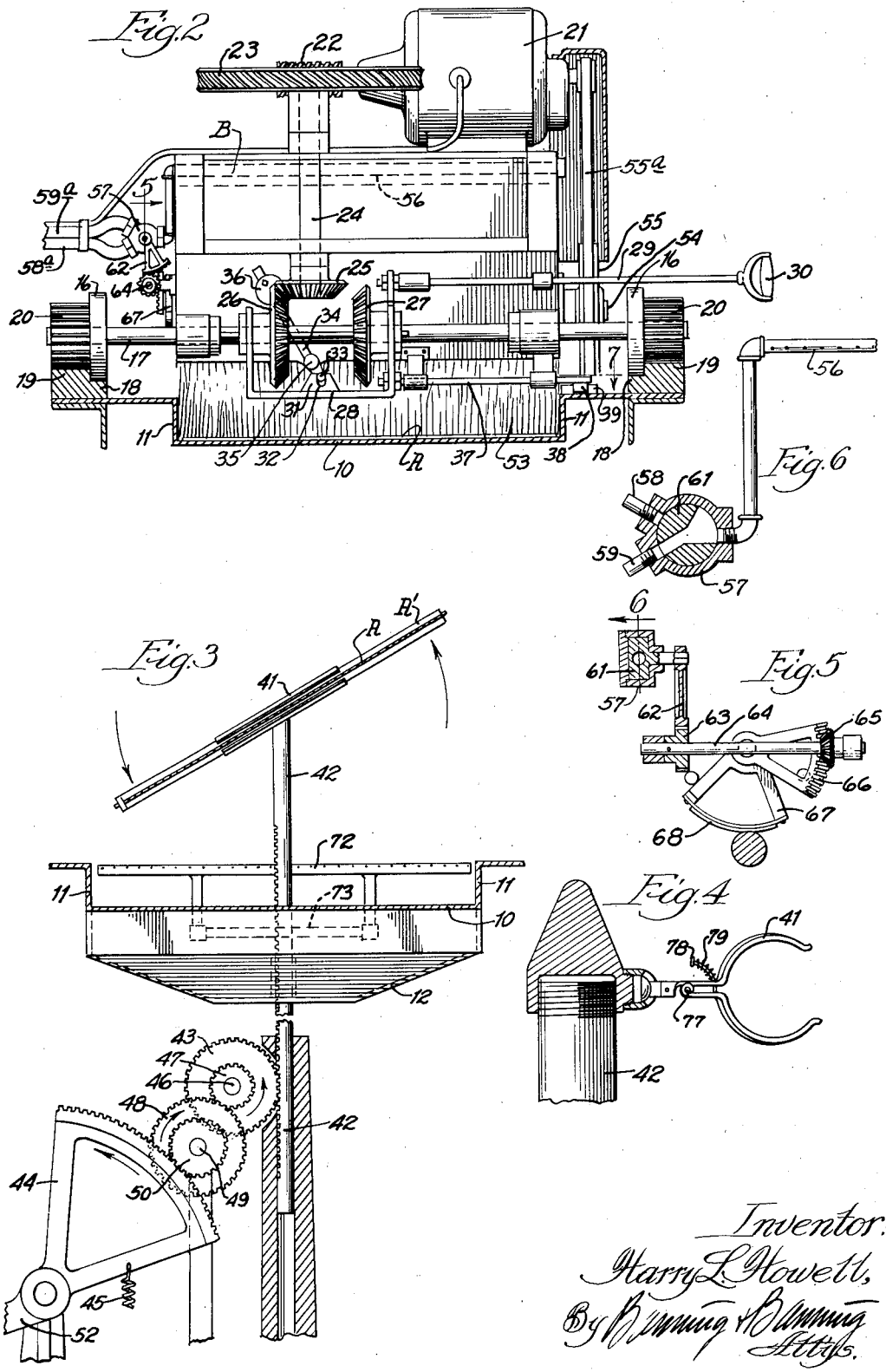

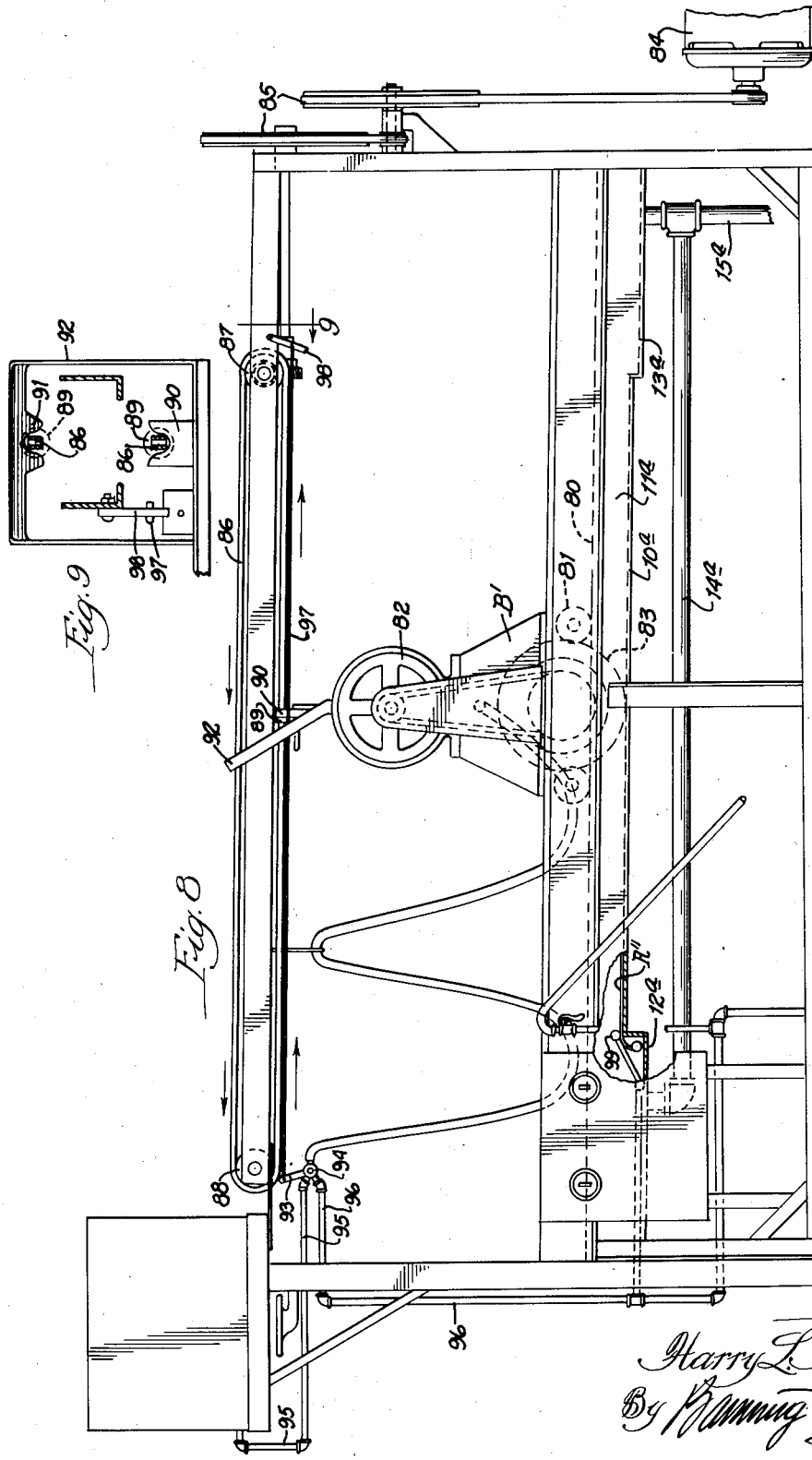

Patented Aug. 8, 1933

1,921,675

UNITED STATES PATENT OFFICE 1,921,675

MACHINE FOR CLEANING WINDOW SHADES

Harry L. Howell, Chicago, Ill., assignor of one-third to William J. Weichel, Elgin, Ill., one-sixth to Adam Storck, Chicago, Ill., and one-sixth to Francis J. Wachter, Chicago, Ill.

Application November 19, 1932
Serial No. 643,352

11 Claims. (Cl. 15—40)

This invention relates to a machine for cleaning window shades, and has for an object the provision of such a machine which is simple, efficient and in a large measure automatic.

Another object is to provide means in such a machine for readily turning the flat article being cleaned, and preferably by a single operator so that first one side and then the other side of the article can be cleaned.

Another object is to provide means for automatically feeding a soap solution or water to the machine, all under control of the operator.

These and other objects, as will hereinafter appear, are accomplished by this invention which is fully described in the following specification and shown in the accompanying drawings, in which—

Figure 1 is a side elevation of a machine embodying the invention;

Fig. 2 is an enlarged partial section on the line 2—2 of Fig. 1;

Fig. 3 is an enlarged section on the broken line 3—3 of Fig. 1;

Fig. 4 is an enlarged detail of the clamp of Fig. 3;

Fig. 5 is an enlarged detail view partly in section on the line 5 of Fig. 2;

Fig. 6 is a section on the line 6 of Fig. 5;

Fig. 7 is an enlarged horizontal view taken on the line 7 of Fig. 2;

Fig. 8 is a modified form of machine shown in Fig. 1; and

Fig. 9 is an enlarged section on the line 9 of Fig. 8.

The embodiment shown in Figs. 1 to 7 inclusive comprises a table 10 mounted upon suitable supports and having ledges 11 (Fig. 2) at the sides to provide a sort of flat trough in which the window shade A, or other article to be cleaned, is placed. This trough is preferably inclined to the right, as shown in Fig. 1, the article to be cleaned being flushed with water and with cleaning fluid, as will hereinafter be described.

Sumps 12 and 13 are located at the left and right ends of this table, as shown in Fig. 1, and any liquid therein is carried off by means of drain pipes 14, 15. A carriage B carrying a rotating cleaning brush is adapted to move back and forth over the table, and is carried by means of four rollers 16 which are mounted on two shafts 17, and which roll on ledges 18 which are mounted along the sides of the table 10 and parallel therewith so that the carriage at all times is at the same distance from the table while passing over it.

Alongside the ledges 18 are racks 19 raised so as to form lateral guides for the rollers 16. Gears 20 on the shafts 17 mesh with the racks 19 so that as these shafts are driven the carriage is propelled along the table, the direction of motion of the carriage depending upon the direction in which the shafts are driven. The carriage is propelled by means of a motor 21 mounted thereon, and having a worm 22 meshing with a worm wheel 23 which is keyed to a vertical shaft 24, to the lower end of which is keyed a bevel gear 25. This gear may be selectively placed in mesh with either the bevel gear 26 or the bevel gear 27, both of which are slidable on the shaft 17 but keyed thereto.

The bevel gears 26, 27 are held a fixed distance apart by means of a yoke 28 in which they are rotatably mounted, the yoke being movable back and forth by means of a rod 29 having a handle 30 extending to one side so as to be readily grasped by the operator. Thus with the parts in the position shown in Fig. 2 the operator by pushing on the handle 30 will disengage the bevel gear 26 from the gear 25, and pass the gear 27 to become engaged therewith, thereby reversing the direction of rotation of the shaft 17 inasmuch as the gear 25 rotates always in the same direction.

To maintain these parts in either of the engaged positions, the yoke 28 carries a lug 31 having a slot 32 in which lies a pin 33 on the end of a lever 34, the lever being fulcrumed at 35 and carrying a weight 36. As the yoke is moved from one position of engagement to the other the weight 36 passes over the dead center and consequently helps to hold the gear in either position of engagement.

As the carriage approaches the lower end of its travel, which is the right-hand end of Fig. 1, means is provided for stopping the travel of the carriage in that direction and for reversing it. To do this, the yoke 28 is provided with a rod 37 which is slidably mounted in suitable guides and which carries a roller 38 which, as the carriage moves to the right, strikes a cam 39 carried by the frame which is placed at an angle so as to urge the rod 37 and yoke 28 to the left, thereby disengaging the gear 26 from the gear 25 and stopping the travel of the carriage to the right and engaging the gears 27, 25, thus causing the carriage to move back to the left or toward the upper end of the table.

The carriage will then continue to move to the left until the yoke 28 is drawn back again either by the operator pulling on the handle 30, or the roller 38 striking the opposite cam 40. The dotted lines of Fig. 7 indicate the path followed by the center of the roller 38 with the motor in operation and the automatic shifting device alone operating. If the yoke 28 is held in a midposition, the carriage will remain stationary except as it might tend to move due to the friction of the rotary brush on the table.

The article A to be cleaned is here shown as a window shade and provided at the bottom with a stick $A^2$, and at the upper end with a roller $A'$ which is secured near its center by means of a clamp 41 which is pivotally connected at its center to a standard 42 located just beyond the upper end of the table, and passing through the sump 12. This standard is provided with a rack which meshes with a gear 43 which is driven, as shown in Fig. 3, through a train of gears from the quadrant 44 which is normally drawn down by means of a spring 45 so as to hold the standard in the lowered position of Fig. 1.

The gear 43 is mounted on a shaft 46 which carries a gear 47 meshing with a gear 48 on a shaft 49 which also has a gear 50 meshing with the quadrant 44, which is operated by means of a treadle 52. Thus as the operator steps on this treadle the standard 42 is elevated, as shown in Fig. 3, so that with the cleaning mechanism B moved to the left of the standard 42, the operator standing near the lower end of the article A can grasp it by the stick $A^2$ at its lower end and turn it so that the roller A' is reversed, after which the shade is again lowered onto the table.

The cleaning mechanism B is provided with a rotary brush 53 which is mounted on a shaft 54 which is driven in a counterclockwise direction, through a pulley 55 by a belt $55^a$ from the shaft of the motor 21. Water and a soap solution are alternately fed to this brush through a pipe 56 (Figs. 2 and 6) which overlies the brush and has a series of holes through which the liquid is fed. This pipe connects with a valve 57 to which water is supplied through a pipe 58, and a soap solution through a pipe 59. The pipe 59 connects with a tank 60 (Fig. 1) through a rubber hose $59^a$, while the pipe 58 connects with a suitable source of water supply through a similar rubber hose $58^a$.

The valve 57 has a plug 61 adapted to oscillate so as to connect either the pipe 58 or the pipe 59 with the pipe 56. The plug 61 is connected to a gear segment 62 which meshes with a pinion 63 on the shaft 64, the shaft carrying a gear 65 meshing with a quadrant 66. The latter is operably connected to a member 67 which carries a section of a drum 68 which frictionally engages the shaft 17 of the carriage. As the carriage of the cleaning mechanism B moves to the right, the shaft 17 will turn in a direction to keep the plug 61 in the position shown in Fig. 6, thereby feeding the soap solution by gravity from the tank 60 to the pipe 56, and thence to the brush 53.

As the movement of the carriage is reversed either automatically through the mechanism of Fig. 7 or by hand operation of the member 31, the rotation of the shaft 17 is reversed thereby shifting the plug 61 so as to cause the opening therein to connect with the pipe 58. When that occurs the soap solution will no longer be fed to the pipe 56, but water will be fed to it instead.

Thus it will be seen that whenever the carriage B moves to the right, soap solution is fed to the cleaning brush 53, whereas when its motion is reversed and it is moved to the left, water is fed to the rotary brush.

A single movement of the carriage from the position at the left to the right-hand end of the machine may possibly be found to be insufficient for uniformly cleaning many shades inasmuch as the lower portion of the shade may require a more thorough cleaning than does the upper portion of the shade which is less exposed when normally in use on a window. Consequently, the operator may optionally make use of the handle 30 to control the operation of the cleaning device, thereby causing it to pass several times over those portions of the shade which require more thorough cleaning.

As the carriage is propelled to the left and approaches the left end of the machine, the forward shaft 17 engages a lever 69 which controls a valve 70 which is connected to the source of water supply. This valve connects through a pipe 71 with a cross pipe 72. This cross pipe is pivotally mounted, as shown in Fig. 3, on a shorter cross pipe 73 which in turn connects with the pipe 71. Water is normally sprayed from the holes in the pipe 72 to the top of the table 10, as shown in Fig. 1, while the lever 69 is in the position shown. As the carriage moves to the left, however, the shaft 17 engages the lever 69, thereby closing the valve 70 and shutting off this source of water supply. At this same time the carriage has passed entirely beyond and to the left of the standard 42, so that it may be raised to the position shown in Fig. 3, whereby the article being cleaned may be reversed or may be removed from the machine. At the same time the pipe 72 may be rocked back as shown in dotted lines so as to permit the standard 42 to raise.

The supply of water to the machine is controlled by means of a valve 74, and a valve 75 serves to supply water to a nozzle 76 by means of which the operator may additionally flush any portion of the article during the process of cleaning. For convenience in grasping a shade roll the clamp 41 (Fig. 4) may consist of two members hingedly connected together at 77, one of them having an arcuate plunger 78 about which is coiled a spring 79 which tends to hold it in normal closed position.

In Figs. 8 and 9 is shown a modified form of the device in which there is a table $10^a$ and sumps $12^a$ and $13^a$ which are drained as in the other form by means of pipes $14^a$ and $15^a$. The side wall $11^a$ carries at each side a rail 80 on which operate rollers 81 of a carriage B'. This carriage has a motor 82 which serves to drive the brush 83 in a counterclockwise direction. The carriage B' is propelled back and forth over the table by means a motor 84 which acts through suitable reduction gearing 85 to drive a chain belt 86. This belt runs constantly as indicated by the arrows over the sprockets 87, 88, and carries a dog 89 which on the lower strand is adapted to engage a finger 90 on the carriage.

As this finger passes under the sprocket 87, the dog 89 is raised, thereby releasing its engagement with the finger 90. As this dog passes around the sprocket 87 it engages lugs 91 on the upper portion of the bracket 92, thereby causing the carriage to be propelled to the left. As this carriage approaches the sprocket 88 it will be disengaged as before, and the dog 89 passing around the sprocket 88 will again engage the finger 90.

Near the ends of movement of this carriage some portion of it engages a lever 93 at the left-hand end of the movement of the carriage. This lever controls a valve 94 similar to the valve 57 of Fig. 6 which serves to supply water or a soap solution. The soap solution is fed through a pipe 95 and water through a pipe 96 to this valve. That is, water is fed only during the time the carriage is traveling to the left, and the soap solution is fed during the time the carriage travels to the right.

The lever 93 is connected through a rod 97 with a lever 98 which is engaged by a part of the carriage when the latter moves to the point at the right at which the carriage is stopped and returned. Thus as the carriage strikes the lever 98 it is moved to the right, thereby acting through the rod 97, shifts the lever 93 to the right, shutting off the soap solution, and connecting the valve 94 with the water pipe 96.

The article A" to be cleaned is laid on the table 10ᵃ as before, but is preferably held down in this instance by a transverse pipe 99 which overlies the table so as to engage and hold the upper end of the article. This pipe has a series of openings similar to the pipe 72 of Fig. 3, and is similarly mounted so as to be rocked about a pipe 100 which connects with the water pipe 96. Thus the pipe 99 serves the double purpose of constantly flushing the article with water and of holding that article on the table.

In both these forms it will be observed that the shade is held only at one end, and that the friction of the brush 53 tends constantly to draw the shade to the right and to keep it held flat and smooth on the table.

This machine makes use of the fact that window shades have a stiff member top and bottom which facilitates their handling in this machine. It will be observed that the shade may be reversed and the stick $A^2$ held at the upper end by the clamp 41. Provision would then be made for the greater thickness of the roller which might hang over the lower end of the table.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. In a cleaning mechanism, a table adapted to hold a flat article to be cleaned, a carriage adapted to move back and forth over the table, a rotary brush carried by the carriage, a soap supply, a water supply, and a valve for alternately connecting said soap and water supply so as to alternately deliver soap or water to the table.

2. In cleaning mechanism, a table adapted to hold a flat article to be cleaned, a carriage adapted to move back and forth over the table, a rotary brush carried by the carriage, a soap supply, a water supply, and a valve operable by movement of the carriage for alternately connecting said soap and water supply so as to alternately deliver soap or water to the table.

3. In cleaning mechanism, a table adapted to hold a flat article to be cleaned, a carriage adapted to move back and forth over the table, a rotary brush carried by the carriage and adapted to brush a flat object on the table, a soap supply, a water supply, a valve operable by movement of the carriage for alternately connecting said soap and water supply so as to alternately deliver soap or water to the table, soap being supplied to the table as the carriage moves in one direction and water being supplied as the carriage moves in the reverse direction, said table sloping toward one end and the brush forcing water toward the same end, and means for draining fluid from each end of the table.

4. In cleaning mechanism, a table adapted to hold a flat article to be cleaned, a carriage adapted to move back and forth over the table, a rotary brush carried by the carriage, a soap supply, a water supply, a valve for alternately connecting said soap and water supply so as to alternately deliver soap or water to the table, and means below the level of the table for clamping an article to be cleaned.

5. In cleaning mechanism, an inclined table adapted to hold a flat article to be cleaned, means for clamping said flat article adjacent the upper end of the table and adapted to lie below the level of the table, means for raising the clamping means above the level of the table, and cleaning mechanism adapted to pass over the table and clamping means when the latter is in the lowered position.

6. In cleaning mechanism, an inclined table adapted to hold a flat article to be cleaned, means for clamping said flat article adjacent the upper end of the table and adapted to lie below the level of the table, means for raising the clamping means above the level of the table, said raising means including a standard adapted to be raised above the table and a clamp pivotally mounted on the standard and adapted to be secured to the end of the article to be cleaned, and cleaning mechanism adapted to pass over the table and clamping means when the latter is in the lowered position.

7. In cleaning mechanism, a table adapted to hold a flat article to be cleaned, a carriage adapted to move back and forth over the table, a rotary brush carried by the carriage, a soap supply, a water supply, a valve for alternately connecting said soap and water supply so as to alternately deliver soap or water to the table, and means below the level of the table for clamping an article to be cleaned, said rotary brush being adapted to pass over the clamping means.

8. In cleaning mechanism, a table adapted to hold a flat article to be cleaned, a carriage adapted to move back and forth over the table, a rotary brush carried by the carriage, a soap supply, a water supply, a valve for alternately connecting said soap and water supply so as to alternately deliver soap or water to the table, means below the level of the table for clamping an article to be cleaned, a standard slidably mounted adjacent the table and pivotally secured to the clamping means, and means for raising the standard for raising the article to be cleaned above the table.

9. In a cleaning mechanism, a table adapted to hold a flat article to be cleaned, a carriage adapted to move back and forth over the table, a rotary brush carried by the carriage, a soap supply, a water supply, a valve for alternately connecting said soap and water supply so as to alternately deliver soap or water to the table, and means for automatically driving the carriage back and forth over the table, the movement of the carriage serving to reverse said valve.

10. In a shade cleaning machine, the combination of a table forming a support for a shade having one end attached to a roller, a vertically movable swiveled means to which the roller is connected permitting the shade, when raised, to be reversed upon the table, and means for reciprocating over the shade a continuously revolving cleaning brush which engages with the shade by a sliding movement away from the supported end whereby to keep the shade taut upon the support.

11. In a shade cleaning machine, the combination of a table forming a support for a shade having a rigid member at each end, swiveled means for gripping one of said rigid members, means reciprocable over the shade for cleaning the same, and means for raising the swiveled means for permitting the shade to be reversed.

HARRY L. HOWELL.